United States Patent Office 3,244,665
Patented Apr. 5, 1966

3,244,665
STABILIZED POLYOXYMETHYLENES
Hugo Malz and Hans Scheurlen, Leverkusen, Germany, assignors to Farbenfabriken Bayer Aktiengesellschaft, Leverkusen, Germany, a German corporation
No Drawing. Filed Apr. 6, 1962, Ser. No. 185,528
Claims priority, application Germany, Apr. 8, 1961, F 33,627
7 Claims. (Cl. 260—45.8)

This invention relates to the stabilisation of polyoxymethylenes and more particularly to stabilisers which can be used for this purpose.

It is known that formaldehyde can be transformed into polyoxymethylene in the presence of catalysts. This polymer carries —$CH_2$—OH groups at the ends of its molecule, and it is these groups which are responsible for a practically quantitative degradation of the polyoxymethylene to monomeric formaldehyde under the action of relatively high temperatures. Consequently, it has been proposed to protect the said terminal hydroxyl groups by acetylation with for example acetic acid anhydride or by etherification with for example dimethyl sulphate to form a polyoxymethylene, the terminal groups of which carry ester or ether bonds. Such reaction products are not subject to degradation under heat stressing to such an extent as is the case with the un-protected polyoxymethylene.

However it has also been found that these polymers having protected terminal groups do not have sufficient stability with respect to degradation at the temperatures which are necessary for processing a thermoplastic synthetic plastic. It has consequently been proposed to use additives with a stabilising action in order to prevent this depolymerisation due to high temperature. Phenols, amines, hydrazines and ureas have inter alia been mentioned as stabilisers for this purpose.

It is necessary for a stabiliser to protect the polyoxymethylene not only against thermal depolymerisation, but also against undesired discoloration, which can be caused by the action of light, temperature or oxygen. The said compounds are not capable of universal use as stabilisers, however, since all of them do not satisfy one or other of the given conditions.

It is an object of the present invention to provide new stabilisers for the stabilisation of polyexymethylenes. A further object is to provide stabilisers which do not discolor. Further objects will appear hereinafter.

It has been found that compounds of the general formula

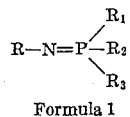

Formula 1 in which R represents a member selected from the group consisting of a hydrocarbon radical containing up to 12 carbon atoms and hydrocarbon radicals containing up to 12 carbon atoms which are bound to the nitrogen atom via a member selected from one group consisting of a $$-\overset{O}{\underset{}{C}}-, \quad \diagdown N-\overset{O}{\underset{}{C}}-$$

and —$SO_2$— group and such radicals which are substituted by a member selected from the group consisting of

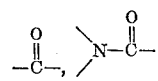

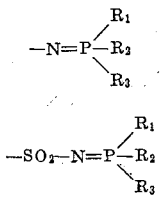

chlorine, nitro and amino groups, wherein $R_1$, $R_2$ and $R_3$ stand for a member selected from the group consisting of hydrocarbon radicals containing up to 20 carbon atoms and hydrocarbon radicals of up to 20 carbon atoms containing an O or N hetero atom and chlorine substituents, and such radicals bound to the phosphorous atom via a member selected from the group consisting of O, S and N atoms, are excellently suitable for stabilising polyoxymethylene.

The hydrocarbon radical represented by R can contain e.g. up to 12 carbon atoms and can be substituted e.g. by halogen, such as chlorine or bromine or by nitro or amino groups. The hydrocarbon radicals represented by $R_1$, $R_2$ and $R_3$ can contain e.g. up to 20 carbon atoms and can be substituted e.g. by halogen, such as chlorine.

Compounds of this type are known and can be prepared by various processes.

Examples of the compounds used according to the invention are set out in the following table.

TABLE 1

| No. | Constitution | |
|-----|--------------|---|
| 1 | ⌬—N=P($OC_2H_5$)$_3$ | Reddish brown oil, B.P.$_{0.1}$: 106° C. |
| 2 | ⌬—N=P(n-butoxy)$_3$ | Reddish brown oil, B.P.$_{0.3}$: 160° C. |
| 3 | ⌬—N=P(—O—⌬—$\overset{CH_3}{\underset{CH_3}{C}}$—$CH_3$)$_3$ | Colourless crystals, M.P. 98° C. |
| 4 | ⌬—P=N(—O—⌬—Cl)$_3$ | Colourless crystals, M.P. 152° C. |
| 5 | ⌬—N=P(—⌬)$_3$ | Colourless crystals, M.P. 129° C. |
| 6 | ⌬—N=P[N($C_3H_7$)$_2$]$_3$ | Light brown oil. |

TABLE 1—Continued

| No. | Constitution | |
|---|---|---|
| 7 | Ph—N=P[N(CH₃)₂]₃ | Brown oil. |
| 8 | Ph—N=P(—N(morpholine))₃ | Colourless crystals, M.P. 141° C. |
| 9 | Ph—N=P(—N(morpholine))₂, N(piperidine)H | Colourless crystals, M.P. 146° C. |
| 10 | Naphthyl—N=P[N(CH₃)₂]₃ | Pale pink crystals, M.P. 83° C. |
| 11 | Naphthyl—N=P(N(morpholine))₃ | Colourless crystals, M.P. 166° C. |
| 12 | O₂N—C₆H₃(Cl)—N=P(N(morpholine))₃ | Yellowish crystals, M.P. 170° C. |
| 13 | Ph—N=P[N(C₄H₉)₂]₂, O—C₆H₄—Cl | Light yellow oil. |
| 14 | Ph—N=P[N(CH₃)₂]₂, O—C₆H₄—C(CH₃)₃ | Light yellow crystals, M.P. 50° C. |
| 15 | Ph—N=P(O—Ph)₂, N(piperidine)H | Colourless crystals, M.P., 66° C. |
| 16 | Ph—N=P(N(morpholine))₂, Ph | Colourless crystals, M.P., 108° C. |
| 17 | Ph—C(O)—N=P[N(CH₃)₂]₃ | Light yellow oil. |
| 18 | Ph—C(O)—N=P(N(morpholine))₃ | Coloured crystals, M.P. 168° C. |
| 19 | H₂N—C₆H₄—C(O)—N=P(N(morpholine))₃ | Light brown crystals, M.P. 214° C. |
| 20 | O₂N—C₆H₄—C(O)—N=P(—Ph)₃ | Colourless crystals, M.P. 210° C. |
| 21 | (Ph)₂N—C(O)—N=P(O—C₆H₄—C(CH₃)₃) | Light brown oil. |

TABLE 1—Continued

| No. | Constitution | |
|---|---|---|
| 22 | C₆H₅—SO₂—N=P(OC₂H₅)₃ | Yellowish oil, B.P.₆.₂: 169° C. |
| 23 | C₆H₅—SO₂—N=P(n-butoxy)₃ | Yellowish oil. |
| 24 | C₆H₅—SO₂—N=P(—O—C₆H₅)₃ | Colourless crystals, M.P. 89° C. |
| 25 | C₆H₅—SO₂—N=P(—O—C₆H₄—C(CH₃)₃)₃ | Colourless crystals, M.P. 101° C. |
| 26 | C₆H₅—SO₂—N=P(—O—C₆H₄—Cl)₃ | Colourless crystals, M.P. 114° C. |
| 27 | C₆H₅—SO₂—N=P(NH—C₆H₄—Cl)₃ | Colourless crystals, M.P. 101° C. |
| 28 | C₆H₅—SO₂—N=P(OC₂H₄—O—C₆H₄—C₁₂H₂₅)₃ | Brown oil. |
| 29 | C₆H₅—SO₂—N=P(—O—C₂H₄—O—C₆H₄—CH(CH₃)₂)₃ | Yellowish oil. |
| 30 | C₆H₅—SO₂—N=P(—OC₂H₄—N(CH₃)—C₆H₅)₃ | Reddish brown oil. |
| 31 | CH₃—SO₂—N=P(—O—C₆H₅)₃ | Colourless crystals, M.P. 90° C. |
| 32 | CH₃—SO₂—N=P(—O—C₆H₄—C(CH₃)₃)₃ | Colourless crystals, M.P. 130° C. |
| 33 | C₆H₅—SO₂—N=P(—S—C₆H₅)₃ | Colourless crystals, M.P. 102° C. |
| 34 | C₆H₅—SO₂—N=P(—C₆H₅)₃ | Colourless crystals, M.P. 161° C. |
| 35 | (C₂H₅O)₃P=N—SO₂—C₄H₉—SO₂—N=P(OC₂H₅)₃ | Colourless crystals, M.P. 38° C. |
| 36 | (C₆H₅—O—)₃P=N—SO₂—C₄H₉—SO₂—N=P(—O—C₆H₅)₃ | Colourless crystals, M.P. 128° C. |
| 37 | (C₂H₅O)₃P=N—SO₂—C₆H₄—SO₂—N=P(OC₂H₅)₃ | Colourless crystals, M.P. 82° C. |
| 38 | (C₆H₅—O—)₃P=N—SO₂—C₆H₄—SO₂—N=P(—O—C₆H₅)₃ | Colourless crystals, M.P. 102° C. |
| 39 | C₂H₅—SO₂—N=P(OC₂H₅)₃ | Colourless oil. |
| 40 | n—C₁₂H₂₅—SO₂—N=P(—O—C₆H₅)₃ | Colourless crystals, M.P. 75° C. |
| 41 | (C₂H₅S)₃P=N—SO₂—C₁₀H₆—SO₂N=P(SC₂H₅)₃ | Colourless crystals, M.P. 83° C. |
| 42 | H₂N—C₆H₄—SO₂—N=P(OCH₃)₃ | Colourless crystals, M.P. 93° C. |
| 43 | C₆H₅—SO₂—N=P(NHC₆H₄O)₃ | Colourless crystals, M.P. 133° C. |

The stabilisers are added to the polyoxymethylenes in quantities of from 0.1 to 10% by weight, preferably in quantities of 0.2 to 5% by weight. The general procedure is to mix the polymer in powder form with the stabiliser in a suitable apparatus and thereafter transform the polymer into a granulated material which can be processed. The stabilisers used according to the invention impart to the macromolecular polyoxymethylene an excellent protection against thermal depolymerisation: they are colourless in themselves and prevent a discoloration of the polymers protected therewith, even under the influence of heat, light and oxygen for a long time. The stabilisers in question have an excellent compatibility with the polyoxymethylene and have no influence on the mechanical and technological properties of the polymers.

*Example 1*

A macromolecular polyoxymethylene protected in the terminal groups by acetylation is mixed with one of the stabilisers indicated in Table 2. The material in powder form is pressed at room temperature to form a tablet and heated at 220° C. in a stream of nitrogen. The quantity of formaldehyde hereby split off is taken up by introduction into an alkaline solution of hydrogen peroxide and thereafter titrating as formic acid. The measurements are made after 20, 60 and 120 minutes. The quantity of formic acid found is a direct standard for the quantity of formaldehyde which has passed over during the measuring interval. By calculation, the quantity of formaldehyde split off per unit of time is established as a percentage and in this way there is obtained a standard for the efficiency of the stabiliser.

From the quantity of formaldehyde split off, the residual quantity of polyoxymethylene is calculated as a percentage, i.e. the quantity of substance remaining after the measurement periods indicated as compared with the quantity of polyoxymethylene introduced.

TABLE 2

| Additive | Quantity in percent | Formaldehyde split off in percent CH₂O/min. after— | | | Percent residual quantity after— | | |
|---|---|---|---|---|---|---|---|
| | | 20 Min. | 60 Min. | 120 Min. | 20 Min. | 60 Min. | 120 Min. |
| None | | 2.75 | 0.17 | 0.13 | 45 | 42 | ¹ 37 |
| Phenyl-β-naphthylamine (for comparison) | 0.5 | 0.37 | 0.26 | 0.19 | 93 | 83 | ² 73 |
| No. 2 of Table 1 | 0.5 | 0.20 | 0.10 | 0.08 | 96 | 92 | 88 |
| No. 4 of Table 1 | 0.5 | 0.56 | 0.72 | 0.61 | 89 | 57 | 44 |
| No. 5 of Table 1 | 0.5 | 0.18 | 0.13 | 0.11 | 96 | 92 | 86 |
| No. 8 of Table 1 | 1.0 | 0.15 | 0.31 | 0.28 | 97 | 85 | 71 |
| No. 9 of Table 1 | 1.0 | 0.15 | 0.18 | 0.30 | 97 | 90 | 76 |
| No. 10 of Table 1 | 1.0 | 0.40 | 0.41 | 0.36 | 92 | 77 | 60 |
| No. 11 of Table 1 | 1.0 | 0.10 | 0.15 | 0.18 | 98 | 92 | 82 |
| No. 16 of Table 1 | 1.0 | 0.25 | 0.18 | 0.14 | 95 | 88 | 81 |
| No. 18 of Table 1 | 1.0 | 0.10 | 0.28 | 0.40 | 98 | 87 | 66 |
| No. 21 of Table 1 | 0.5 | 0.20 | 0.24 | 0.20 | 96 | 88 | 77 |
| No. 22 of Table 1 | 0.5 | 0.15 | 0.18 | 0.20 | 97 | 90 | 78 |
| No. 23 of Table 1 | 0.5 | 0.25 | 0.21 | 0.24 | 95 | 87 | 73 |
| No. 24 of Table 1 | 0.5 | 0.20 | 0.13 | 0.12 | 96 | 91 | 84 |
| No. 25 of Table 1 | 2.0 | 0.25 | 0.21 | 0.21 | 95 | 87 | 76 |
| No. 26 of Table 1 | 0.5 | 0.40 | 0.41 | 0.38 | 92 | 78 | 55 |
| No. 28 of Table 1 | 0.5 | 0.15 | 0.20 | 0.36 | 97 | 89 | 67 |
| No. 29 of Table 1 | 1.0 | 0.10 | 0.12 | 0.17 | 98 | 93 | 83 |
| No. 31 of Table 1 | 0.5 | 0.20 | 0.11 | 0.08 | 96 | 92 | 88 |
| No. 32 of Table 1 | 0.5 | 0.20 | 0.11 | 0.09 | 96 | 92 | 87 |
| No. 34 of Table 1 | 0.5 | 0.10 | 0.10 | 0.18 | 98 | 94 | 84 |
| No. 35 of Table 1 | 1.0 | 0.50 | 0.25 | 0.20 | 90 | 80 | 68 |
| No. 36 of Table 1 | 1.0 | 0.10 | 0.15 | 0.30 | 98 | 92 | 74 |
| No. 37 of Table 1 | 0.5 | 0.15 | 0.20 | 0.23 | 97 | 89 | 76 |
| No. 38 of Table 1 | 0.5 | 0.10 | 0.14 | 0.20 | 98 | 92 | 80 |

¹ Test element becomes dark brown after short time.
² Test element becomes reddish brown after short time.

As is clear from Table 2, the compounds used according to the invention impart excellent protection against thermal depolymerisation to the polyoxymethylene. It is of particular advantage that a polyoxymethylene to which stabilisers are added remains practically colourless even with thermal stressing over a long period, whereas an unstabilised polyoxymethylene experiences a strong discoloration towards dark brown in addition to the depolymerisation. As regards their colour-stabilising effect, the new stabilisers are in particular also superior to the phenyl-β-naphthylamine used for comparison purposes, which latter substance certainly has an adequate stabilising action against depolymerisation, but at the same time also causes a strong discoloration (dark reddish brown) of the polyoxymethylene, even when the latter is heated for a relatively short period.

We claim:
1. Heat and light stabilized polyoxymethylene including, as stabilizer, from 0.1 to 10% by weight of a compound of the general formula:

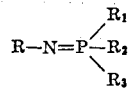

wherein R is selected from the group consisting of (a) an aromatic hydrocarbon radical having up to 12 carbon atoms, a saturated aliphatic hydrocarbon radical having up to 12 carbon atoms, an aromatic hydrocarbon radical having up to 12 carbon atoms which is bound to the nitrogen atom via a member selected from the group consisting of

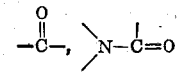

and —SO₂— radicals, a saturated aliphatic hydrocarbon radical having up to 12 carbon atoms which is bound to a nitrogen atom via a member selected from the group consisting of

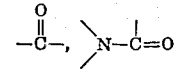

and —SO₂— radicals, and (b) the radicals enumerated under (a) when mono-substituted by a member of the group consisting of

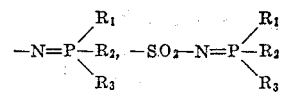

chlorine, nitro and amino radicals; and wherein $R_1$, $R_2$, and $R_3$ each stand for a member of the group consisting of (c) an aromatic hydrocarbon radical having up to 20 carbon atoms, a saturated aliphatic hydrocarbon radical having up to 20 carbon atoms, (d) the radicals enumerated under (c) when containing a heteroatom selected from the group consisting of O and N atoms, (e) the radicals enumerated under (c) when substituted by chlorine, and (f) the radicals enumerated under (c), (d), and (e) when bound to the phosphorous atom via a member selected from the group consiting of O, S and N atoms.

2. The heat and light stabilized polyoxymethylene of claim 1 wherein said stabilizer is present in an amount from 0.2 to 5% by weight.

3. Polyoxymethylene stabilized with from 0.1 to 10% by weight of

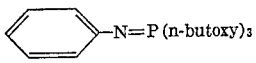

4. Polyoxymethylene stabilised with from 0.1 to 10% by weight of

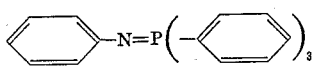

5. Polyoxymethylene stabilised with from 0.1 to 10% by weight of

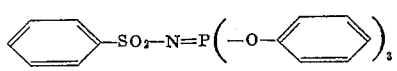

6. Polyoxymethylene stabilised with from 0.1 to 10% by weight of $$CH_3-SO_2-N=P(-O-\langle-O-\bigcirc\rangle)_3$$

7. Polyoxymethylene stabilised with from 0.1 to 10% by weight of $$CH_3-SO_3-N=P\left(-O-\bigcirc-\underset{\underset{CH_3}{|}}{\overset{\overset{CH_3}{|}}{C}}-CH_3\right)_3$$

References Cited by the Examiner

UNITED STATES PATENTS

| | | | |
|---|---|---|---|
| 2,883,362 | 4/1959 | Rowenwald et al. | 260—45.9 |
| 2,936,298 | 5/1960 | Hudgin et al. | 260—45.9 |
| 3,076,782 | 2/1963 | Mohr et al. | 260—45.8 |
| 3,085,097 | 4/1963 | Strobel et al. | 260—45.85 |
| 3,107,230 | 10/1963 | Malz et al. | 260—45.9 |
| 3,118,887 | 1/1964 | Hardy et al. | 260—45.8 |
| 3,125,597 | 3/1964 | Wahl et al. | 260—45.85 |

LEON J. BERCOVITZ, *Primary Examiner.*

WILLIAM H. SHORT, DONALD E. CZAJA, *Examiners.*